Oct. 15, 1957  L. M. FORBUSH ET AL  2,809,869
VEHICLE WHEEL
Filed Feb. 26, 1953  2 Sheets-Sheet 1

INVENTORS
Lothrop M. Forbush, &
BY Roland V. Hutchinson
Willits, Helwig & Baillio
ATTORNEYS Oct. 15, 1957 L. M. FORBUSH ET AL 2,809,869
VEHICLE WHEEL
Filed Feb. 26, 1953 2 Sheets-Sheet 2

INVENTORS
Lothrop M. Forbush, &
BY Roland V. Hutchinson
Willits, Helwig & Bailko
ATTORNEYS United States Patent Office 2,809,869
Patented Oct. 15, 1957

2,809,869

VEHICLE WHEEL

Lothrop M. Forbush, Ferndale, and Roland V. Hutchinson, Birmingham, Mich., assignors to General Motors Corporation, Detroit, Mich., a corporation of Delaware Application February 26, 1953, Serial No. 338,998

1 Claim. (Cl. 301—97)

This invention relates to improvements in vehicle wheels and more particularly to a vehicle wheel having an improved rim and mounting flange assembly.

Typical wheel assemblies for automobiles, trucks and other vehicles comprise a tire supporting rim, usually of the drop-center type, carrying a mounting flange or wheel disk member and a central hub portion which is either formed integrally with the mounting flange or secured thereto. In many applications a brake drum is mounted within the wheel structure and secured to the central hub member and/or to the mounting flange.

Up to the present time certain difficulties have been encountered in the manufacture of vehicle wheels of the above-mentioned type. Proper alignment of the rim and wheel disk or mounting flange during assembly has generally required the services of highly skilled workers as well as the use of specialized clamping and positioning fixtures. In some prior wheel structures the rim and mounting flange have been joined by means of non-locking tapered flange sections. Structures of this type not only are difficult to position accurately during manufacture but necessitate drilling and riveting at varying angles, thus further increasing the time and cost of manufacture.

Heretofore, a typical wheel disk or mounting flange has been bolted or riveted to the rim member at the drop-center section. In such wheel assemblies the maximum diameter of a brake drum which can be mounted within the rim is limited, not by the internal diameter of the rim, but by the thickness of the mounting flange and/or the bolts, rivets, or other inwardly extending projections within said rim. Hence, since the brake drum cannot extend longitudinally outside the rim, the maximum area of brake surface which can be provided within a rim is dictated by the diameter of the brake drum. As vehicle speeds constantly increase and the use of larger section tires precludes increasing the diameter of the wheels to permit the use of larger brake drums, the problem of providing adequate brakes for automobiles, trucks and other vehicles is becoming increasingly difficult.

Accordingly, it is a principal object of this invention to provide an easily manufactured wheel assembly which permits the use of an improved brake drum. A further object is to provide an improved wheel rim having a configuration adapted to facilitate assembly of various wheel component parts. A still further object is to provide an improved wheel rim and mounting flange assembly. Other objects of the invention will more fully appear from the following description taken in connection with the accompanying drawings, in which.

In general, the construction contemplated in the present invention includes a vehicle wheel assembly wherein a portion of the conventional wheel rim drop-center section is replaced by a cylindrical surface which is concentric with and parallel to the wheel axis. In a preferred embodiment, this cylindrical area in the rim has a diameter greater than that of the drop-center rim section to which it is connected by means of an outwardly extending flange.

Figure 1:
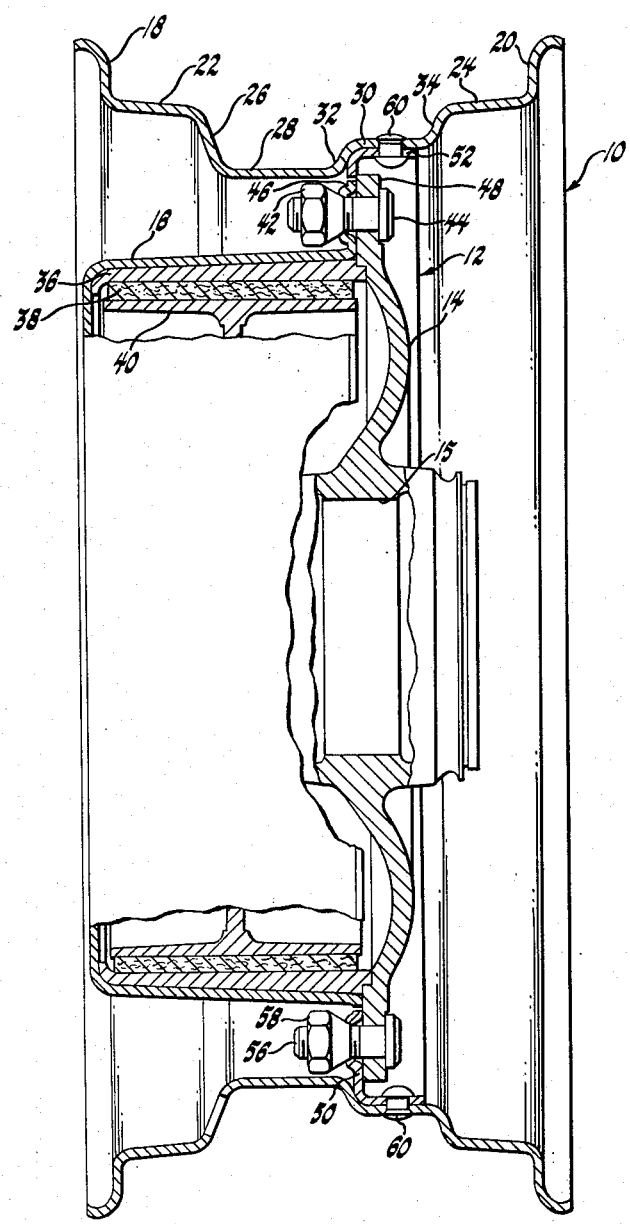
Fig. 1 is a side view, partially in section, of a vehicle wheel assembly embodying the invention.
Figure 2:
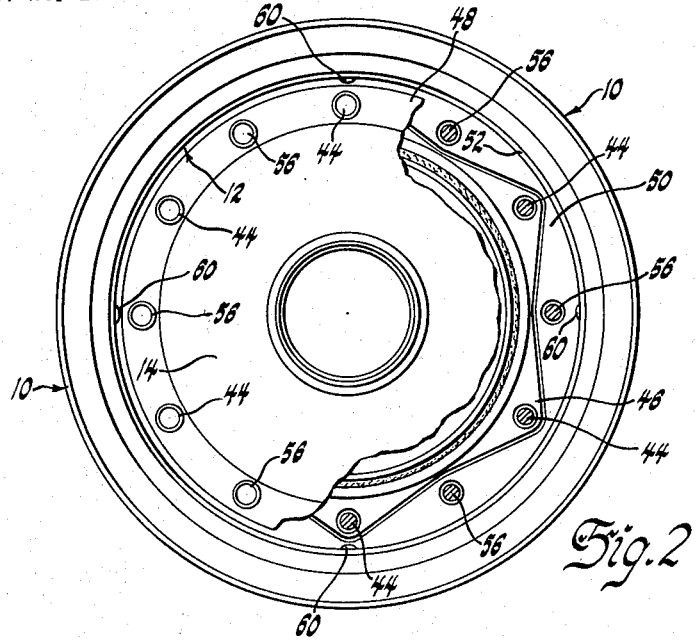
Fig. 2 is a plan view partially broken away to better illustrate mounting details of a wheel assembly embodying the invention.
Figure 3:
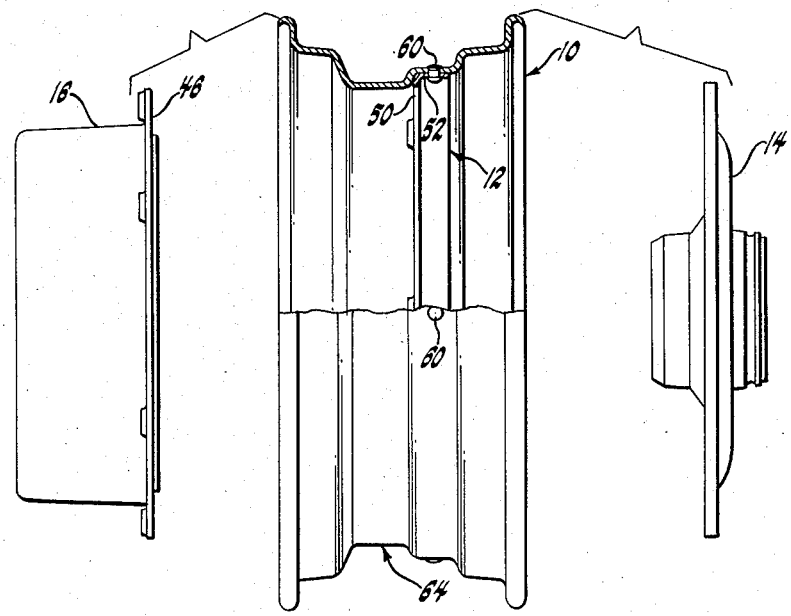
Fig. 3 is a side view, partially in section, illustrating the component parts of a vehicle wheel assembly in accordance with the present invention.

Referring more particularly to the drawings:

Figs. 1, 2 and 3 illustrate an improved vehicle wheel assembly in accordance with the preferred embodiment of the invention. As shown in Figs. 1 and 3, the vehicle wheel assembly includes a rim and mounting flange assembly comprising a rim member and an annular mounting flange, indicated generally at 10 and 12, respectively, to which are secured a central hub member 14, having a bearing supporting surface 15, and a brake drum 16 housing an annular wear surface 36 of cast iron or the like and a brake shoe 40 carrying a brake lining 38. As shown in Fig. 1, the cylindrical brake wear liner 36 is supported at each end to reduce surface distortion under the temperatures and pressures encountered in service, and to prevent any so-called "bell-mouthing" or other uneven wear of the brake lining and/or wear surface.

As shown in Figs. 1 and 2 the brake drum 16 is secured to the central hub member 14 by a plurality of nuts 42 and bolts 44 extending through aligned holes in the hub member and in an irregularly shaped circumferential flange 46 on the brake drum. In a like manner, the rim and mounting flange assembly is secured to the central hub member by means of a plurality of nuts 58 and bolts 56 extending through a plurality of aligned holes in the hub member and irregularly shaped mounting flange 50.

As illustrated in Fig. 2, the rim and mounting flange assembly as a unit, and the brake drum are independently and easily removable from the central hub member by removing nuts 42 and/or 58. Fig. 3 illustrates, and indicates the relationship of, the component parts of a vehicle wheel structure in accordance with the preferred embodiment of the invention, namely, a brake drum 16, a rim and mounting flange unit indicated generally by 64, and a central hub member 14.

Considering now the rim and mounting flange assembly in more detail, as shown in Fig. 1, the rim member, indicated generally at 10, has two outwardly extending flanges 18 and 20 which, together with axially extending flanges 22 and 24 respectively, provide a tire bead support. An outwardly extending flange 26 joins flange 22 with the drop-center cylindrical area 28 of the rim. Disposed longitudinally between the drop-center area 28 and axially extending flange 24, and having an intermediate diameter, is a cylindrical area 30 which is concentric with, and parallel to, the wheel axis. Cylindrical surface 30 is joined to the drop-center cylindrical surface 28 by means of an outwardly extending flange 32 and to axially extending flange 24 by means of an outwardly extending flange 34.

The annular mounting flange, illustrated in Figs. 1–3 and indicated generally at 12, is secured to the rim by means of a plurality of rivets 60 extending through the rim and flange in holes normal to the wheel axis. The mounting flange 12 has an axially extending surface 52 which is concentric with and substantially parallel to the wheel axis and an irregularly shaped, inwardly extending circumferential flange 50 which is substantially normal to the wheel axis. The axially extending surface 52, adapted to engage the cylindrical area 30 of the rim as shown in Fig. 1, preferably has an outside diameter slightly larger than the internal diameter of the cylindrical area 30 so that the mounting flange may be firmly secured to the rim by a locking interference force fit to form a rim and mounting flange assembly which can be drilled, riveted, welded, etc. as a unit without requiring the use of special fixtures or clamps.

It will be seen that the mounting flange 12 is not only firmly secured to the rim by a locking interference fit, but is accurately positioned in proper alignment by being forced axially, while in contact with cylindrical surface 30, until it contacts the outwardly extending flange 32 of the rim which serves as a built-in locating stop.

From the foregoing description it will now be understood that we have provided an easily assembled vehicle wheel comprising a central hub member, a brake drum removably secured thereto, and a rim and mounting flange assembly also removably secured to the central hub member. A vehicle wheel embodying the present invention not only is well able to resist the axial, radial, and torque stresses encountered but permits the use of an improved brake drum having a maximum diameter dictated by the minimum internal diameter of the wheel rim.

Various changes and modifications of the embodiments of the invention described herein may be made by those skilled in the art without departing from the spirit and principles of the invention.

What is claimed:

A wheel rim comprising, axially spaced tire retaining flanges, tire bead supporting flange portions connected to said retaining flanges, a drop center rim portion attached to one of said supporting flange portions by a generally radially extending flange, an axially extending cylindrical portion connected to said drop center portion and the other of said supporting flange portions by generally radially extending flanges, said cylindrical portion having a diameter greater than the diameter of said drop center rim portion, and an annular mounting ring secured to said cylindrical portion and having flanged surfaces bearing against said cylindrical portion and said radially extending flange connecting said cylindrical portion to said drop center rim portion.

References Cited in the file of this patent

UNITED STATES PATENTS

| | | |
|---|---|---|
| 1,496,987 | Hugo | June 10, 1924 |
| 1,749,917 | Meadowcroft | Mar. 11, 1930 |
| 1,985,682 | Miller | Dec. 25, 1934 |
| 2,019,109 | Ash | Oct. 29, 1935 |
| 2,139,833 | LeJeune et al. | Dec. 13, 1938 |
| 2,149,205 | Brink | Feb. 28, 1939 |
| 2,246,017 | Sinclair | June 17, 1941 |
| 2,329,945 | Schatzman | Sept. 21, 1943 |
| 2,410,209 | Godsey | Oct. 29, 1946 |